(12) United States Patent
Dittmar et al.

(10) Patent No.: US 7,829,619 B2
(45) Date of Patent: Nov. 9, 2010

(54) FLAME-RETARDANT FILLER FOR PLASTICS

(75) Inventors: Thomas Dittmar, Cologne (DE); Bernhard Hentschel, Cologne (DE); Genoveva Bilandzic, Cologne (DE); Mario Neuenhaus, Elsdorf (DE); Rene Herbiet, Eupen (BE)

(73) Assignee: Albemarle Corporation, Baton Rouge, LA (US)

( * ) Notice: Subject to any disclaimer, the term of this patent is extended or adjusted under 35 U.S.C. 154(b) by 340 days.

(21) Appl. No.: 11/580,137

(22) Filed: Oct. 12, 2006

(65) Prior Publication Data

US 2007/0082996 A1    Apr. 12, 2007

(30) Foreign Application Priority Data

Apr. 15, 2005    (DE)  .................. 10 2004 018 336

(51) Int. Cl.
*C08K 3/34*    (2006.01)
(52) U.S. Cl. .................. 524/444; 423/626; 423/625; 524/437; 106/403; 252/609
(58) Field of Classification Search .......... 524/437, 524/444, 441; 423/525, 526; 106/403; 252/609
See application file for complete search history.

(56) References Cited

U.S. PATENT DOCUMENTS

| 5,194,243 A | 3/1993 | Pearson et al. |
| 5,401,703 A | 3/1995 | Fukuda |
| 6,087,191 A * | 7/2000 | Boggs .................. 438/12 |
| 6,506,358 B1 * | 1/2003 | Stamires et al. ........... 423/625 |
| 2005/0075024 A1 * | 4/2005 | Ranken et al. ........... 442/141 |
| 2005/0124745 A1 * | 6/2005 | Bauer et al. .............. 524/437 |

FOREIGN PATENT DOCUMENTS

| EP | 1 193 232 A | 4/2002 |
| WO | WO 01/00529 A | 1/2001 |

* cited by examiner

*Primary Examiner*—Vasu Jagannathan
*Assistant Examiner*—Doris L Lee
(74) *Attorney, Agent, or Firm*—James A. Jubinsky

(57) ABSTRACT

The invention relates to a flame-retardant filler based on aluminium hydroxide, its use in polymers and a method for its production, in which aluminium hydroxide in the form of bayerite or a bayerite/gibbsite mixture is modified under pressure at temperatures of at least 170° C. in the presence of water and crystal growth regulator, the aluminium hydroxide used as starting material having an average particle size $d_{50}$ from 0.1 to 4 µm.

20 Claims, 3 Drawing Sheets

Scanning electron micrograph of comparative filler example 1

Scanning electron micrograph of filler example 1 according to the invention

Scanning electron micrograph of filler example 2 according to the invention

Scanning electron micrograph of filler example 3 according to the invention

TGA of filler example 1 according to the invention in comparison with ATH and MDH

FLAME-RETARDANT FILLER FOR PLASTICS

The present invention relates to a flame-retardant filler, a method of its manufacture and its use in plastics and rubber.

The use of mineral fillers to provide flame retardancy of plastics and rubber, generally referred to as polymer systems hereinafter, has long been known. Metal hydroxides, especially aluminium hydroxides (such as for example ATH) and magnesium hydroxides, have been used as mineral fillers in this context. The metal hydroxides are used alone or in combination with one another and sometimes in combination with other flameproofing additives, including organic, for example halogen-containing additives.

The flameproofing action is based essentially on endothermic decomposition of the crystals, release of water in the form of water vapour, a dilution effect of the polymer matrix and to a certain extent formation of a more or less solid ash layer ("carbonization"), leading to a certain degree of mechanical stabilization of the burning polymer. This can for example reduce or even completely prevent the production of burning drips. Furthermore, the encrusted ash layer on the surface of the burning polymer acts as a kind of "protective barrier" for the underlying polymer layers, which may prevent rapid propagation of combustion.

Moreover, the use of a combination of these metal hydroxides with clay minerals, especially organically intercalated sheet silicates, for this purpose is known for example from EP 0 333 514 A1, WO-A-00/68312 and WO-A-00/66657.

One disadvantage of the known flame-retardant fillers, however, is that the mineral they contain already decomposes at temperatures that occur in the course of manufacture or processing of the polymer systems to be treated with them. For instance, ATH already begins to decompose starting from about 200° C. This precludes its use in polymer systems that need to be processed at much higher temperatures, for example polyamide (PA) or polybutylene terephthalate (PBT). Standard ATH can only be used under certain conditions, if at all, in printed-circuit boards, where high-temperature soldering is required (e.g. 288° C. in so-called FR-4 circuit boards).

Another possible disadvantage is incompatibility between the minerals and the plastics. There is, for example, incompatibility in the case of magnesium hydroxide and polyesters. This may manifest itself for example in an excessive increase in torque as an indication of chemical reaction (viscosity increase) in a Haake laboratory kneader when using approx. 30-50 wt.-% magnesium hydroxide in PBT.

Furthermore, flameproofing systems comprising combinations of metal hydroxides or halogenated flameproofing agents with organically intercalated clay minerals (sheet silicates), based for example on bentonite or hectorite (so-called "nanoclays"), have the unfavourable property that they discolour excessively when heated. This can be attributed essentially to the clay material, which is based on natural materials containing varying amounts and types of impurities. A further reason for the occurrence of discoloration when using nanoclays is the limited thermal stability of the chemical compounds used for modification of the natural or synthetic sheet silicates such as (though not exclusively) the so-called quaternary ammonium salts. Examples of these are: distearyldimethyl ammonium chloride or stearylbenzyldimethyl ammonium chloride.

A further disadvantage in using the stated sheet silicates is that their flame-retardant action only becomes effective through delamination (also called exfoliation) of the individual silicate layers. As a rule this occurs either during synthesis of the polymer or during mixing in existing mixing units, for example internal mixers or Buss Ko-kneaders or twin-screw extruders, or in roll mills. Thus, different mixing schedules or machines can lead to different results, which sometimes are not reproducible. Moreover, the costs of said materials are very much higher than for metal hydroxides such as ATH.

Figure 1:
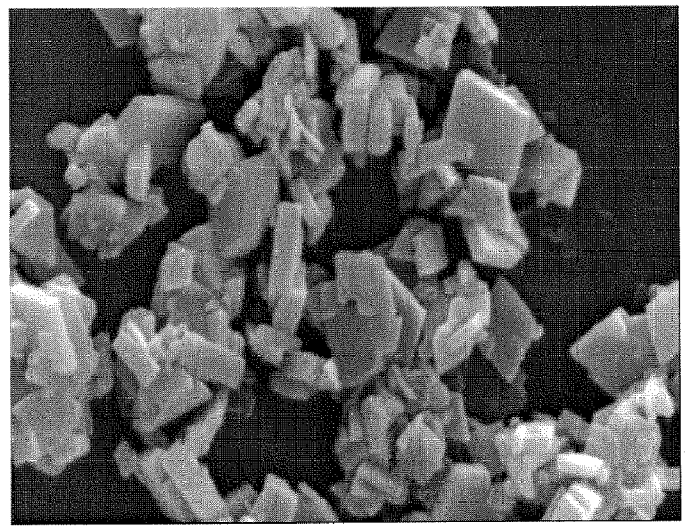
FIG. 1 is a scanning electrograph of comparative filler example 1.

The present invention has therefore the object providing a flame-retardant filler which is inexpensive, can be manufactured synthetically, only decomposes at higher temperatures than is the case with aluminium hydroxide, displays less discoloration at elevated temperatures than combinations of metal hydroxide or halogenated flame-proofing agents with organically intercalated sheet silicates and displays more favourable ash formation than the known materials, whereby the overall the flameproofing properties can even be improved.

This object is solved with a flame-retardant filler that can be manufactured from aluminium hydroxide in form of a bayerite/gibbsite mixture by hydrothermal treatment at a temperature of at least 170° C. in the presence of water and acid or base as crystal growth regulator under pressure, the aluminium hydroxide used as starting material having an average particle size $d_{50}$ from 0.1 to 4 µm.

The bayerite portion of said mixture being on a weight basis e.g. at least 50%. It is preferably at least 70%, in particular at least 80%, more preferred at least 90%.

The invention comprises the flame-retardant filler as such, the method of manufacture for this filler, its use and polymer systems treated with it. Preferred embodiments of the method are the subject of the respective subclaims.

It was found, surprisingly, that the filler according to the invention displays very good flameproofing properties, but can be manufactured inexpensively using simple means. In particular, the exceptional temperature stability, low tendency to discoloration and the very favourable formation of an ash layer or the consistency of the ash layer that forms, respectively, are entirely unexpected. In particular these very good flame-retardant properties are surprising and unexpected because the filler variants produced are boehmite crystals (AlOOH). In contrast to aluminium hydroxide $(Al(OH)_3)$, the energy required for the endothermic decomposition is much less for boehmites than for $Al(OH)_3$, so that ordinarily there is considerable impairment of the flame-retardant action.

The starting material for making the flame-retardant filler according to the invention is an aqueous suspension of aluminium hydroxide (a suspension of a bayerite/gibbsite mixture). The bayerite portion in such a bayerite/gibbsite mixture, based on the weight of bayerite and gibbsite, is e.g. at least 50%, in particular at least 70%, more preferred at least 80% and especially at least 90%.

The bayerite used as starting material can for example be produced according to the method described in EP 1 206 412 B1, see in particular the disclosure on page 3, paragraph 21 of that document. If required, gibbsite is added in the desired amount, and the BET surface area and the particle size can be adjusted beforehand by appropriate choice of crystal precipitation conditions of the gibbsite and if necessary grinding to the desired range.

The flame-retardant filler according to the invention can be produced from the aluminium hydroxide used by a hydrothermal treatment, which requires the presence of water at temperatures of at least 170° C. up to max. 340° C., in particular at least 190° C. to 250° C. or 190° C. to 215° C. under pressure. At the same time, to obtain the filler according to the invention, the presence of a crystal growth regulator is required.

The aluminium hydroxide used preferably has a specific surface area of 1 to 100 $m^2/g$, in particular 10 to 60 $m^2/g$, and 20 to 40 $m^2/g$ is preferred, and about 30 $m^2/g$ is particularly preferred.

In addition, the aluminium hydroxide used has an average particle size $d_{50}$ of 0.1 to 4 μm, preferably 0.5 to 4 μm, particularly 1 to 3 μm, and preferred about 2 μm.

Preferably, an aluminium hydroxide mixture (bayerite/gibbsite mixture) that is used has a BET specific surface area of approx. 30 $m^2/g$ and a $d_{50}$ value preferably between 0.1 and 4 μm, in particular between 0.5 and 4 μm, and preferably between 0.9 and 2.5 μm, particularly preferred approx. 2 μm.

The amount of aluminium hydroxide used is for example in the range from 1 to 30 wt.-%, preferably 5 to 20 wt.-%, especially 6 to 10, e.g. 8 wt.-%, always relative to the total weight of water and aluminium hydroxide. Thus, essentially, an aqueous suspension of aluminium hydroxide is used, which has the respective stated content of solid aluminium hydroxide (bayerite/gibbsite mixture).

The hydrothermal treatment, which gives rise to modification, is carried out under pressure, for example in the range from 7 to 144.2 bar, especially 12 to 54.3 bar, preferably up to 23 bar. Such a pressure can for example build up autogenously in an autoclave.

The amount of time required for the hydrothermal treatment for manufacture of the flame-retardant filler according to the invention also depends on the particular materials used, the amounts and the temperature and pressure conditions. The hydrothermal treatment can, for example, be carried out for a period of at least 10 minutes, in particular at least 15 minutes, preferably at least 30 minutes, more preferably at least approximately 1 hour or longer, and periods of up to 2 days, in particular up to 24 hours, more preferably up to 5 hours are possible.

The crystal growth regulator used can for example be an acid, the pH value preferably being in the range from 0.5 to 6, especially 1 to 5 and preferably 1 to 4.5. Particularly preferably, it is less than 4.

It is, however, also possible to use a base as crystal growth regulator, and then the pH value is preferably in the range from 10 to 14, especially 11 to 14 and preferably 12 to 14. Particularly preferably, it is greater than 12.

For example, hydrochloric acid (HCl) or amidosulphonic acid (sulfamic acid $NH_2SO_3H$) can be used as the crystal-growth-regulating acid. The actual acid used has an effect on the macroscopic crystal structure. Addition of hydrochloric acid, for example, produces a fibrous crystal structure, whereas the use of amidosulphonic acid leads to a lamellar (or plate like) crystal form. The amount of acid depends on the pH required.

Alternatively, it is possible for example to use sodium hydroxide solution (NaOH) as a crystal-growth-regulating base. Then the amount of base again depends on the pH required. When sodium hydroxide solution (pH>12) is added, an oval/elliptical crystal structure is produced.

The modified solid produced is cooled, e.g. to 50 to 60° C. or less, separated from the aqueous liquid, for example by filtration, then washed, for example with water, and dried.

Drying can be carried out in a usual way. For example, drying in a stove at at least 105° C. is suitable, with mechanical comminution optionally if required in a suitable mill, e.g. a pin mill, a ball mill or an impact mill.

A preferred drying process is spray drying in commercial spray towers, as obtainable for example from the company Niro. Air is preferably used as the drying gas, advantageously with its amount and temperature being adjusted so that it has an outlet temperature of 100 to 150° C. Spray drying is preferably carried out on a suspension. The solid, preferably washed with water, is resuspended in water. The solids content of the suspension is between 5 and 15 wt.-%, but can be raised to approx. 50 wt.-% by adding a suitable dispersant. Suitable dispersants are for example salts of polyacrylic acid, formic acid or acetic acid. They can be used in the amounts usually employed for this, for example in an amount from 0.01 to 5 wt.-%, preferably from 0.05 to 1 wt.-%. As an alternative, with suitable design of the spraying tower it is also possible to use paste spraying.

The flame-retardant filler according to the invention can be used for flameproofing treatment of polymers, i.e. thermoplastics, elastomers and thermosets (uncured, or cured if required). In particular the polymer can be a thermoplastic polymer (e.g. polyolefin, vinyl polymer, styrene polymer, polyacrylate), a thermoplastic polycondensate (e.g. polyamide, polyester) or a thermosetting polycondensate (e.g. phenol plastics, unsaturated polyester resins) or a polyadduct (e.g. epoxy resins, polyurethanes). Both the homopolymers and the copolymers, and suitable mixtures of at least two of the polymers, may be considered. Those preferred are the (thermoplastic or crosslinked) polyolefins and copolymers thereof, e.g. PE, LDPE, LLDPE, HDPE, EVA, EEA, EMA, EBA, PP, as well as rubbers and PVC.

The flame-retardant filler according to the invention can be used alone or together with other known flame-retardant fillers, in particular with aluminium hydroxide (ATH), magnesium hydroxide (MDH), a halogen-containing flameproofing agent, phosphorus or organophosphorus compounds, or also nitrogen-containing flameproofing agents (e.g. melamine cyanurate).

A correspondingly treated polymer system contains the filler according to the invention in an amount sufficient for flameproofing purposes. Suitable amounts are for example 0.1 to 250 parts (phr), in particular 5 to 150 parts (phr), preferably 10 to 120 parts (phr), particularly preferably 15 to 80 parts (phr) of the filler according to the invention, relative to 100 parts (phr) of the plastic. If other flame-retardant fillers are also to be used, their amount is generally in the range from 249.9 to 0 parts (phr), relative to 100 parts (phr) of the plastic. The abbreviation "phr" stands for "parts per hundred parts of polymer".

The flame-retardant filler according to the invention can be produced for example from an aqueous bayerite-gibbsite suspension by hydrothermal treatment in an autoclave, with addition of at least one crystal growth regulator. A suitable autoclave possesses a heating device for achieving the required final temperature, is sufficiently acid-resistant and pressure-resistant, and is equipped with a stirrer. The crystal growth regulator used is for example at least one acid or at least one base. On conclusion of the hydrothermal process, the solid obtained is filtered through a suitable filter, e.g. a paper filter, and resuspended twice in hot distilled water at approx. 80° C. and filtered again. At least 1.5 l water is used per 100 g solid in this washing process.

This is followed by drying, for example at at least 105° C. in a stove. Stove drying is followed by comminution, e.g. with a mortar. As an alternative, it is also possible to use a mill, e.g. a pin mill. Drying in a spray tower can also be used as an alternative to stove drying. For this, the filler according to the invention is resuspended after the last washing operation. Preferably this is effected with distilled water and a solids content of approx. 10 wt.-%. To increase the solids content, it is possible to use suitable dispersants, for example salts of polyacrylic acid.

However, drying can also be carried out using a belt dryer or by methods in which the product is fluidized with hot air and conveyed through a kind of mill.

The production of boehmite under hydrothermal conditions with aluminium hydroxide as raw material is already known.

The production of boehmite is described in WO 98/58876, but from a precipitation reaction of a supersaturated sodium aluminate solution at temperatures below 100° C.

U.S. Pat. No. 6,143,816 describes a hydrothermal method of production of boehmite, in which the starting material is hydrargillite and is not a (preferably activated by grinding) bayerite. Moreover, no crystal growth regulator is used. These crystals do not display the excellent flameproofing properties in plastics according to the invention, as is demonstrated by comparative example of application V5 in Tables 1 and 2.

Figure 3:
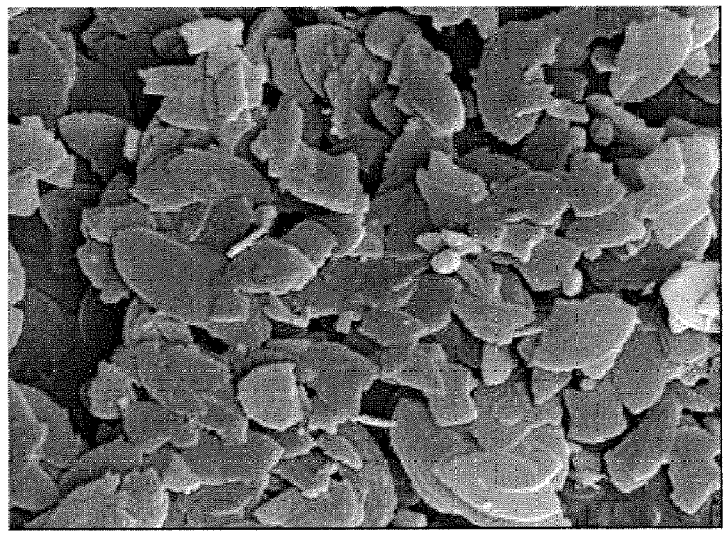
FIG. 3 is a scanning electrograph of filler example 2, a filler according to the present invention.

U.S. Pat. Nos. 5,401,703 and 5,306,680 describe a hydrothermal process in which aluminium hydroxide is treated under pressure in an aqueous or alkaline solution. Only "aluminium hydroxide" is stated as the starting material. In filler example 2 according to the invention, the bayerite/gibbsite mixture was also treated hydrothermally in an alkaline solution. However, the crystallites shown in FIG. 3 are of roundish or oval shape and do not have the angular crystal structure shown in U.S. Pat. Nos. 5,401,703 and 5,306,680, FIGS. 4 and 5. This angular crystal structure is obtained, however, if the filler is produced as stated in comparative filler example 1, as described in U.S. Pat. No. 5,306,680.

U.S. Pat. No. 6,080,380 describes a hydrothermal process in which, however, aluminium hydroxide as raw material is converted to aluminium oxide at temperatures above 300° C. and correspondingly high pressures.

The following comparative filler example 1 shows the result of boehmite production corresponding to the state of the art, but not of boehmite production according to the invention.

COMPARATIVE FILLER EXAMPLE 1

For this, 5 l of an aqueous gibbsite suspension with a solids content of 80 g/l was placed in a 10-liter autoclave. The gibbsite (=hydrargillite) had an average grain diameter of 1.3 µm. Stirring continuously, the suspension was heated to 230° C. and held autogenously at this temperature for 14 minutes. Then the suspension was cooled to room temperature, filtered, washed with distilled water and dried for 24 hours at 105° C., then deagglomerated using a mortar. FIG. 1 shows a scanning electron micrograph of comparative filler example 1 (not according to the invention). The individual crystals do not have an oval/elliptical structure, nor are they fibrous or lamellar.

The aqueous bayerite/gibbsite suspension used in the following filler examples according to the invention had a solids content of 80 g/l. The BET specific surface was 30 m$^2$/g with an average particle size $d_{50}$ of 2 µm.

Filler Example 1 (Invention)

In the present filler example 1, a 10-liter autoclave was loaded with 5 l of the bayerite/gibbsite suspension. Then amidosulphonic acid was added as crystal growth regulator, until a pH value of 1.7 was established. Next the suspension was heated in the autoclave to 210° C. while stirring continuously (heating rate approx. 2° C./min) and was maintained at this temperature for 1 hour, stirring continuously. The pressure in the autoclave adjusts autogenously according to the prevailing temperature. It was then cooled to 50 to 60° C. while stirring (cooling rate: approx. 1.5° C./min). The suspension was then filtered using filter paper. The filter cake thus obtained was then twice resuspended in distilled water and filtered again. In each re-suspension 1.5 l of distilled water was used per 100 g of solids.

Figure 2:
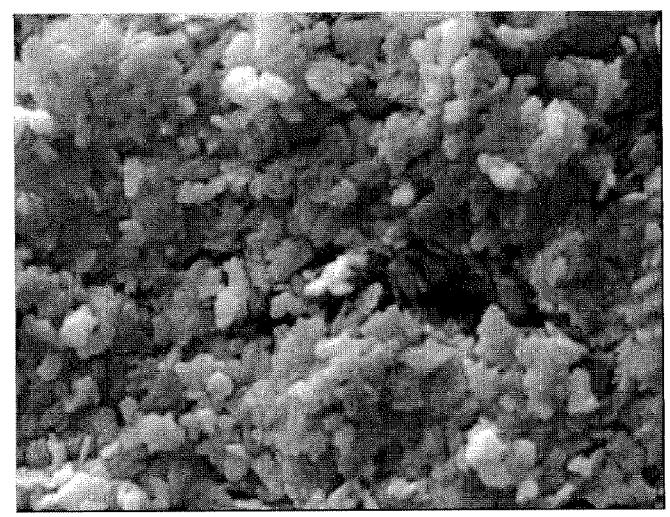
FIG. 2 is a scanning electrograph of filler example 1, a filler according to the present invention.

Next, the filtrate was resuspended again in distilled water at a solids content of 10 wt.-% and then atomized with a pilot-scale spray dryer (Niro Atomizer, "Minor Production" type). The throughput of the spray tower was approx. 2.5 kg/h solids, inlet air temperature was approx. 500° C. and outlet air temperature 120-130° C. FIG. 2 shows a scanning electron micrograph of filler example 1 according to the invention.

The filler according to the invention, produced in this way, can then be used as flameproofing agent in polymer mixtures. This can also take place in combination with for example conventional ATH, MDH, halogen-containing, phosphorus-containing or nitrogen-containing flameproofing agents or other flame-retardant additives.

The filler obtained can be characterized as follows:
Crystalline boehmite, lamellar
BET: between 70 and 150 m$^2$/g
$d_{10}$: 0.2 to 0.5 µm
$d_{50}$: 0.5 to 3.0 µm
$d_{90}$: 3.0 to 7.0 µm Individual, lamellar crystals of irregular appearance, which sometimes coalesce to an irregular grain structure according to FIG. 2. The individual crystals (this is not intended to mean the grains composed of the crystals) have a thickness of about 0.03 to 0.08µ and fit in a circle with a diameter of up to max. approx. 0.35 µm.

Filler Example 2

In the present filler example 2, a 10-liter autoclave was loaded with 5 l of the bayerite-hydrargillite suspension. Then concentrated sodium hydroxide solution was added as crystal growth regulator, until a pH of 13 was established. Next the suspension was heated in the autoclave to 180° C., stirring continuously (heating rate approx. 2° C./min) and was kept at this temperature for three hours, stirring continuously. The pressure in the autoclave adjusts autogenously according to the prevailing temperature. It was then cooled to 50 to 60° C. while stirring (cooling rate: approx. 1.5° C./min). The suspension was then filtered using filter paper. The filter cake thus obtained was then twice resuspended in distilled water and filtered again. In each resuspension 3 l of distilled water was used per 100 g of solids.

Next, the filtrate was dried in a stove at 105° C. for 16 hours and was ground gently for deagglomeration. FIG. 3 shows a scanning electron micrograph of filler example 2 according to the invention.

The filler according to the invention, produced in this way, can then be used as flameproofing agent in polymer mixtures. This can also take place in combination with for example conventional ATH, MDH, halogen-containing, phosphorus-containing or nitrogen-containing flameproofing agents or other flame-retardant additives.

The filler obtained can be characterized as follows:
Crystalline boehmite, oval to elliptical
BET: between 8 and 40 $m^2/g$
$d_{10}$: 0.4 to 0.7 µm
$d_{50}$: 0.7 to 2.2 µm
$d_{90}$: 2.2 to 4.5 µm Oval/elliptical crystals with little if any agglomeration (i.e. little if any grain formation) according to FIG. 3. The individual crystals have a thickness of about 0.1 to 0.2 µm with length of the major axis of approx. 1.6 to 3.2 µm and length of the minor axis of approx. 1.4 to 2.0 µm.

Filler Example 3

In the present filler example 3, a 10-liter autoclave was loaded with 5 l of the bayerite-gibbsite suspension. Then hydrochloric acid was added as crystal growth regulator, until a pH of 1.7 was established. Next the suspension was heated in the autoclave to 210° C., stirring continuously (heating rate approx. 2° C./min) and was kept at this temperature for three hours, stirring continuously. The pressure in the autoclave adjusts autogenously according to the prevailing temperature. It was then cooled to 50 to 60° C. while stirring (cooling rate: approx. 1.5° C./min). The suspension was then filtered using filter paper. The filter cake thus obtained was then twice resuspended in distilled water and filtered again. In each resuspension 1.5 l of distilled water was used per 100 g of solids.

Figure 4:
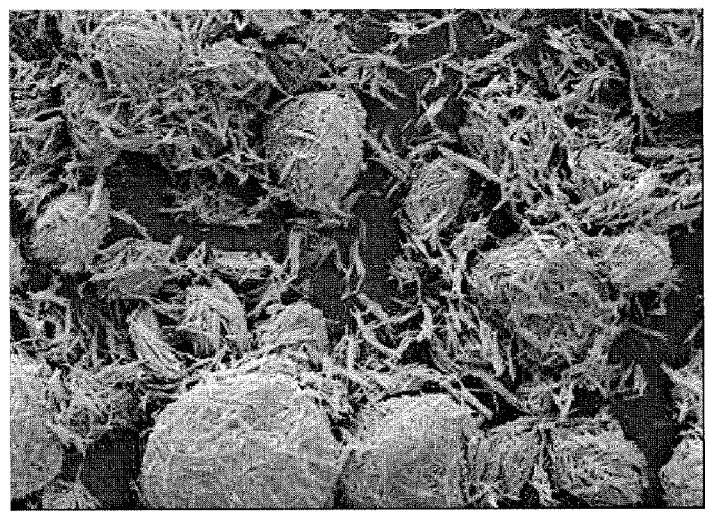
FIG. 4 is a scanning electrograph of filler example 3, a filler according to the present invention.

Next, the filtrate was dried in a stove at 105° C. for 16 hours and was ground gently for deagglomeration. FIG. 4 shows a scanning electron micrograph of filler example 3 according to the invention.

The filler obtained can be characterized as follows:
Crystalline boehmite, fibrous
BET: between 80 and 150 $m^2/g$
$d_{10}$: 0.04 to 0.15 µm
$d_{50}$: 0.15 to 0.8 µm
$d_{90}$: 0.8 to 2.0 µm Fibrous crystal structure according to FIG. 4, with partial coalescence to spherical forms (grains). Length of the individual fibres: approx. 0.3 to 3 µm, diameter approx. 0.05 to 0.15 µm.

The filler according to the invention, produced in this way, can then be used as flameproofing agent in polymer mixtures. This can also take place in combination with for example conventional ATH, MDH, halogen-containing, phosphorus-containing or nitrogen-containing flameproofing agents or other flame-retardant additives.

EXAMPLES OF APPLICATION

Examples of application are given below for the plastics treated with the filler according to the invention (filler examples 1, 2 and 3) together with comparative products (comparative application examples V1 to V5) both with respect to composition (Table 1) and with respect to the relevant test results (Table 2).

The mixtures were all produced in a roll mill (type W150M from the Collin company) in a usual manner familiar to a person skilled in the art.

After mixture production in the roll mill, plastic sheets were produced using a two-plate press, and the specimens required for subsequent tests were stamped from these.

The following tests are performed as relevant test values/results:

Cone calorimeter data according to ASTM E 1354 at 35 kW/$m^2$ on 3 mm thick sheets. The value shown is the Peak Heat Release Rate in kW/$m^2$ (abbreviation: PHRR; this is the maximum power output per unit area, measured in the cone calorimeter during combustion of the specimen). The lower the PHRR value, the better the flameproofing of the specimen. The Time to Ignition value in s is also shown (abbreviation: TTI; this is the point of time at which the specimen begins to burn owing to exposure to heat in the cone calorimeter). The higher the TTI value, the better the flameproofing of the specimen. Accordingly, a low PHRR value with at the same time a TTI value as high as possible is advantageous. Often, for further characterization, the ratio of the TTI value to the PHRR value is calculated (called the Fire Performance Index, FPI). It follows from the definitions of the respective individual quantities that a higher FPI represents better flameproofing action.

The oxygen index (LOI value) according to ASTM D 2863 on specimens 15 cm long, 2 mm thick and 50 mm wide. A higher LOI value indicates better flameproofing.

The UL94 V value on specimens 3.2 mm thick. Classification according to the UL94-V standard is "Fail", V 2 (better), V 1 (even better) or V 0 (highest category).

In addition, ash formation was quantified by weighing the test specimen, to be tested in the cone calorimeter, before and after combustion. The ratio A of the mass $M_n$ after combustion to $M_v$ before combustion can then be calculated:

$A = M_n/M_v.$

This can be compared with the ash residue value $A_{th}$ calculated theoretically. The theoretical ash residue $A_{th}$ is calculated by assuming, to a good approximation, that all organic components burn away without residue and consequently the ash consists only of the respective inorganic components, i.e. the oxides of the filler used. Thus, as is well known, aluminium hydroxide (ATH) Al(OH)$_3$ and boehmite AlO(OH) are converted to Al$_2$O$_3$, and magnesium hydroxide (MDH) Mg(OH)$_2$ is converted to MgO.

Purely mathematically, it can be calculated on the basis of the molecular weights that for example 100 g ATH only weighs 65.3 g after complete conversion to the oxide phase Al$_2$O$_3$ as a result of loss of water (or as a percentage: 65.3%). Similarly for MDH, 100 g Mg(OH)$_2$ is converted to 69.1 g MgO (or as a percentage: 69.1%). By igniting in a crucible at 1200° C., the percentage conversion factor for the filler according to the invention was determined as 81.9%. For example, the theoretical ash residue $A_{th}$ for a plastics recipe consisting of:

| Beforehand: | phr | wt. % | After combus-tion: | phr | wt. % |
|---|---|---|---|---|---|
| Polymer | 100 | 40 | | 0 | 0 |
| ATH | 120 | 48 | × 0.653 = | 78.4 | 31.4 |
| Filler according to the invention | 30 | 12 | × 0.819 = | 24.6 | 9.8 |
| Total | 250 | 100 | | 103 | 41.2 | can be calculated as:

$$A_{th} = \frac{103}{250} = 41.2\%$$

The abbreviation "phr" in the above stands for "parts per hundred parts of polymer".

The larger the difference $$D = A - A_{th}$$

between the value A determined by measurement and the theoretical value $A_{th}$, the better is the ash formation and the burned specimen has more ash residue.

The brightness level according to ISO Brightness R457 on pressed plastic sheets with an instrument from the company Elrepho, type Elrepho 2000.

Application Example V1 (Comparison)

396.9 g (=100 phr) of ethylene vinyl acetate (EVA) Escorene Ultra UL00119 from ExxonMobil was processed on the Collin roll mill with 595.4 g (=150 phr) of aluminium hydroxide Martinal OL-104/LE from Martinswerk GmbH together with 4.8 g (=1.2 phr) of aminosilane Ameo from Degussa AG and 2.9 g (=0.75 phr) of the antioxidant Ethanox 310 from Albemarle Corporation at a roll temperature of 140° C. to a rolled sheet of 1000 g (=251.95 phr). The aminosilane ensures better coupling of the filler to the polymer matrix.

Application Example V2 (Comparison)

396.9 g (=100 phr) of ethylene vinyl acetate (EVA) Escorene Ultra UL00119 from ExxonMobil was processed on the Collin roll mill with 563.6 g (=142 phr) of aluminium hydroxide Martinal OL-104/LE from Martinswerk GmbH together with 31.8 g (=8 phr) of the nanoclay Nanofil 15 from Süd-Chemie and with 4.8 g (=1.2 phr) of aminosilane Ameo from Degussa AG and 2.9 g (=0.75 phr) of the antioxidant Ethanox 310 from Albemarle Corporation at a roll temperature of 140° C. to a rolled sheet of 1000 g (=251.95 phr). The aminosilane ensures better coupling of the filler to the polymer matrix.

Application Example V3 (Comparison)

396.9 g (=100 phr) of ethylene vinyl acetate (EVA) Escorene Ultra UL00119 from ExxonMobil was processed on the Collin roll mill with 543.8 g (=137 phr) of aluminium hydroxide Martinal OL-104/LE from Martinswerk GmbH together with 51.6 g (=13 phr) of the nanoclay Nanofil 15 from Süd-Chemie and with 4.8 g (=1.2 phr) of aminosilane Ameo from Degussa AG and 2.9 g (=0.75 phr) of the antioxidant Ethanox 310 from Albemarle Corporation at a roll temperature of 140° C. to a rolled sheet of 1000 g (=251.95 phr). The aminosilane ensures better coupling of the filler to the polymer matrix.

Application Example V4 (Comparison)

396.9 g (=100 phr) of ethylene vinyl acetate (EVA) Escorene Ultra UL00119 from ExxonMobil was processed on the Collin roll mill with 416.8 g (=105 phr) of aluminium hydroxide Martinal OL-104/LE from Martinswerk GmbH together with 178.6 g (=45 phr) of the filler not according to the invention from comparative filler example 1 and with 4.8 g (=1.2 phr) of aminosilane Ameo from Degussa AG and 2.9 g (=0.75 phr) of the antioxidant Ethanox 310 from Albemarle Corporation at a roll temperature of 140° C. to a rolled sheet of 1000 g (=251.95 phr). The aminosilane ensures better coupling of the filler to the polymer matrix.

Application Example V5 (Comparison)

396.9 g (=100 phr) of ethylene vinyl acetate (EVA) Escorene Ultra UL00119 from ExxonMobil was processed on the Collin roll mill with 416.8 g (=105 phr) of aluminium hydroxide Martinal OL-104/LE from Martinswerk GmbH together with 178.6 g (=45 phr) of the boehmite filler Apyral AOH 180 obtainable from the company Nabaltec and with 4.8 g (=1.2 phr) of aminosilane Ameo from Degussa AG and 2.9 g (=0.75 phr) of the antioxidant Ethanox 310 from Albemarle Corporation at a roll temperature of 140° C. to a rolled sheet of 1000 g (=251.95 phr). The aminosilane ensures better coupling of the filler to the polymer matrix.

Application Example 1 (Invention)

396.9 g (=100 phr) of ethylene vinyl acetate (EVA) Escorene Ultra UL00119 from ExxonMobil was processed on the Collin roll mill with 476.3 g (=120 phr) of aluminium hydroxide Martinal OL-104/LE from Martinswerk GmbH together with 119.1 g (=30 phr) of the filler according to the invention (filler example 1) and with 4.8 g (=1.2 phr) of aminosilane Ameo from Degussa AG and 2.9 g (=0.75 phr) of the antioxidant Ethanox 310 from Albemarle Corporation at a roll temperature of 140° C. to a rolled sheet of 1000 g (=251.95 phr). The aminosilane ensures better coupling of the filler to the polymer matrix.

Application Example 2 (Invention)

396.9 g (=100 phr) of ethylene vinyl acetate (EVA) Escorene Ultra UL00119 from ExxonMobil was processed on the Collin roll mill with 416.8 g (=105 phr) of aluminium hydroxide Martinal OL-104/LE from Martinswerk GmbH together with 178.6 g (=45 phr) of the filler according to the invention (filler example 1) and with 4.8 g (=1.2 phr) of aminosilane Ameo from Degussa AG and 2.9 g (=0.75 phr) of the antioxidant Ethanox 310 from Albemarle Corporation at a roll temperature of 140° C. to a rolled sheet of 1000 g (=251.95 phr). The aminosilane ensures better coupling of the filler to the polymer matrix.

Application Example 3 (Invention)

396.9 g (=100 phr) of ethylene vinyl acetate (EVA) Escorene Ultra UL00119 from ExxonMobil was processed on the Collin roll mill with 416.8 g (=105 phr) of aluminium hydroxide Martinal OL-104/LE from Martinswerk GmbH together with 178.6 g (=45 phr) of the filler according to the invention (filler example 2) and with 4.8 g (=1.2 phr) of aminosilane Ameo from Degussa AG and 2.9 g (=0.75 phr) of the antioxidant Ethanox 310 from Albemarle Corporation at a roll temperature of 140° C. to a rolled sheet of 1000 g (=251.95 phr). The aminosilane ensures better coupling of the filler to the polymer matrix.

Application Example 4 (Invention)

396.9 g (=100 phr) of ethylene vinyl acetate (EVA) Escorene Ultra UL00119 from ExxonMobil was processed on the Collin roll mill with 535.8 g (=135 phr) of aluminium hydroxide Martinal OL-104/LE from Martinswerk GmbH together with 59.5 g (=15 phr) of the filler according to the invention (filler example 3) and with 4.8 g (=1.2 phr) of aminosilane Ameo from Degussa AG and 2.9 g (=0.75 phr) of the antioxidant Ethanox 310 from Albemarle Corporation at a roll temperature of 140° C. to a rolled sheet of 1000 g (=251.95 phr). The aminosilane ensures better coupling of the filler to the polymer matrix.

The following Table 1 shows the formulations of the examples of application according to the invention and the comparative examples of application.

replaced with the respective filler according to the invention at the same total degree of filling of the mixture), in comparison with the mixture V1 that is only flameproofed with ATH, begin to burn later (higher TTI values) and at the same time have substantially lower PHRR values. The latter means that the specimen generates a lower maximum of heat radiation during combustion, i.e. it does burn, but less intensively. The EVA mixtures treated according to the invention also show, in comparison with comparative example of application V1, the highest FPI (Fire Performance Index) values. Admittedly, the TTI and FPI value can also be increased with the nanoclay in

TABLE 1

| Formulation | V1 phr | V2 phr | V3 phr | V4 Phr | V5 phr | Example 1 phr | Example 2 phr | Example 3 phr | Example 4 phr |
|---|---|---|---|---|---|---|---|---|---|
| | Comparative examples | | | | | | | | |
| EVA, 19% VA | 100 | 100 | 100 | 100 | 100 | 100 | 100 | 100 | 100 |
| ATH OL 104/LE | 150 | 142 | 137 | 105 | 105 | 120 | 105 | 105 | 135 |
| Invention (filler example 1) | — | — | — | — | — | 30 | 45 | — | — |
| Invention (filler example 2) | — | — | — | — | — | — | — | 45 | — |
| Invention (filler example 3) | — | — | — | — | — | — | — | — | 15 |
| Nanoclay, Nanofil 15 | — | 8 | 13 | — | — | — | — | — | — |
| Filler, comparative example 1 | — | — | — | 45 | — | — | — | — | — |
| Apyral AOH 180 | — | — | — | — | 45 | — | — | — | — |
| Aminosilane | 1.2 | 1.2 | 1.2 | 1.2 | 1.2 | 1.2 | 1.2 | 1.2 | 1.2 |
| Ethanox 310 | 0.75 | 0.75 | 0.75 | 0.75 | 0.75 | 0.75 | 0.75 | 0.75 | 0.75 |

Table 2 shows the values for TTI, PHRR, FPI, LOI, UL94V, D and some brightness and yellowness values determined for the examples of application according to the invention and the comparative examples of application.

comparative examples of application V2 and V3, relative to mixture V1 that is only flameproofed with ATH; however, it can be seen in comparative example of application V3 that with higher doses of the nanoclay than in V2, the PHRR value

TABLE 2

| | V1 | V2 | V3 | V4 | V5 | Example 1 | Example 2 | Example 3 | Example 4 |
|---|---|---|---|---|---|---|---|---|---|
| | Comparative examples | | | | | | | | |
| TTI (s) | 121 | 150 | 188 | 105 | 114 | 129 | 145 | 122 | — |
| PHRR (kW/m$^2$) | 119 | 106 | 144 | 164 | 156 | 83 | 89 | 103 | — |
| FPI = TTI/PHRR (m$^2$ s/kW) | 1.02 | 1.42 | 1.31 | 0.64 | 0.73 | 1.55 | 1.63 | 1.18 | — |
| LOI, 2 × 50 mm$^2$, (% O$_2$) | 37.8 | 36.8 | 36.3 | 33 | 38 | 39.2 | 38.2 | 38.3 | 42.8 |
| UL94V, 3.2 mm | FAIL | V 0 | V 0 | FAIL | FAIL | V 0 | V 0 | V 0 | V 0 |
| D (%) | 3.6 | 5.4 | 4.6 | 5.6 | — | 7.4 | 9.7 | 8.1 | — |
| Brightness (%) | 60.5 | — | 27.3 | — | — | — | 47.2 | — | — |
| Yellowness (%) | 30.1 | — | 46.3 | — | — | — | 26.3 | — | — |

It was found that the EVA mixtures of examples of application 1, 2 and 3, in which the fillers according to the invention are incorporated (always with one part of the ATH rises again, even above the PHRR value of comparative example of application V1, which indicates more intensive combustion.

In particular, comparison of V4 and V5 with V1 shows that when fillers not according to the invention are used (i.e. boehmite produced according to the state of the art), no advantages are obtained in the combustion values. The boehmite produced according to comparative filler example 1 was used in V4 and the commercially available boehmite Apyral AOH 180 from Nabaltec was used in V5. The mixtures start to burn earlier (lower TTI values than for V1) and display the highest PHRR values in Table 2. Consequently the FPI index is also the lowest of all in Table 2. In addition, no advantages are obtained in comparison with V1 with respect to the LOI values and the UL94V classification. In particular, V4 shows a marked decrease to just 33% $O_2$.

The oxygen index LOI only improves with the mixtures according to the invention (filler examples 1, 2 and 3) in comparison with V1. With V2 and V3 (both mixtures contain nanoclays) there is even a somewhat lower (and hence poorer) LOI value than with V1.

In contrast to comparative example of application V1, all the fillers according to the invention (filler examples 1, 2 and 3) also lead to combustion classification in UL Class V0.

The difference D between the ash residue value A determined from measurement and the theoretically calculated value $A_{th}$ shows, for the mixtures in examples of application 1, 2 and 3 with the fillers according to the invention (filler examples 1 and 2), the highest values (a percentage conversion factor of 65% was used for the mixtures with nanoclay, because according to the manufacturer's data 35 wt.-% is of an organic nature and so is no longer present in significant amounts after the combustion process).

As an example, the brightness and the yellowness were also determined on pressed sheets in comparative examples of application V1 and V3 and in example of application 2 according to the invention. The advantages in example of application 2 according to the invention, relative to the nanoclay mixture, are quite apparent: although in this case 45 phr of the filler according to the invention from filler example 1 was incorporated, the brightness is higher and the yellowness is lower than in V3, which, with 13 phr of nanoclay, contains a comparatively low ATH substitution.

Example Of Application V6 (Comparison)

100 phr (=350 g) of polypropylene (PP) Moplen RP 320 H from the company Basell was processed in the Collin roll mill with 185.7 phr (=650 g) magnesium hydroxide Magnifin H 5 MV from Martinswerk GmbH at a roll temperature of 170° C. to produce a rolled sheet of 285.5 phr (=1000 g).

Example Of Application V7 (Comparison)

100 phr (=350 g) of polypropylene (PP) Moplen RP 320 H from the company Basell was processed in the Collin roll mill with 170.2 phr (=595.7 g) magnesium hydroxide Magnifin H 5 MV from Martinswerk GmbH together with 15.5 phr (=54.3 g) of the nanoclay Nanofil 15 from the company Süd-Chemie at a roll temperature of 170° C. to produce a rolled sheet of 285.7 phr (=1000 g).

Example Of Application 5 (Invention)

100 phr (=350 g) of polypropylene (PP) Moplen RP 320 H from the company Borealis was processed in the Collin roll mill with 130 phr (=455 g) magnesium hydroxide Magnifin H 5 MV from Martinswerk GmbH together with 55.7 phr (=195 g) of the filler according to the invention (filler example 1) at a roll temperature of 170° C. to produce a rolled sheet of 285.7 phr (=1000 g).

The following Table 3 gives the formulations of example of application 5 and of the comparative examples of application V6 and V7.

TABLE 3

| Formulation | Comparative example V6 Phr | Comparative example V7 Phr | Example 5 phr |
|---|---|---|---|
| PP Moplen RP 320 H | 100 | 100 | 100 |
| Magnifin H 5 MV | 185.7 | 170.2 | 130 |
| Filler according to the invention (filler example 1) | — | — | 55.7 |
| Nanoclay, Nanofil 15 | — | 15.5 | — |

Table 4 shows the values of the difference D between the measured and theoretical ash residue for comparative examples of application V6 and V7 and example of application 5 according to the invention.

TABLE 4

| | Comparative example V6 | Comparative example V7 | Example 5 |
|---|---|---|---|
| D (%) | 5.3 | 0.5 | 7.8 |

It can be seen that there is a substantial improvement in ash residue with the filler according to the invention.

Figure 5:
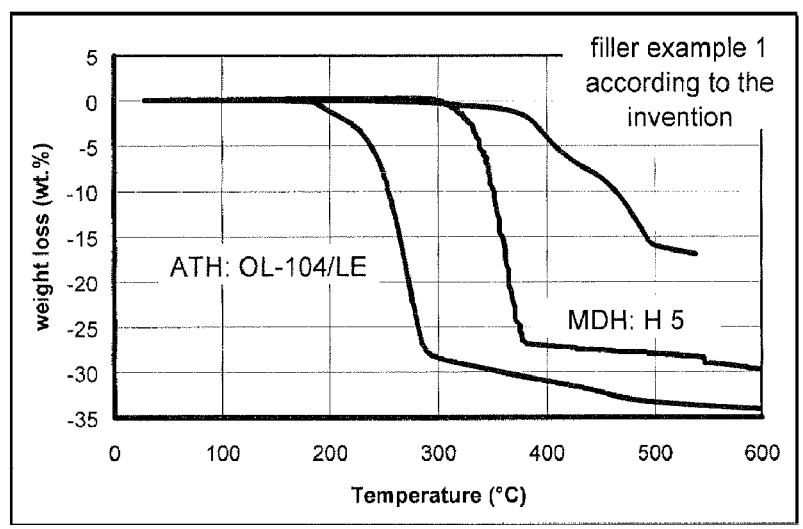
FIG. 5 is a geographical representation of the thermogravimetric analysis of filler example 1, a filler according to the present invention, in comparison with a commercially available ATH and MDH.

FIG. 5 shows a TGA of the filler according to the invention from filler example 1 in comparison with ATH Martinal OL-104/LE from Martinswerk GmbH and MDH Magnifin H 5, also from Martinswerk GmbH. Measurement was in air with a heating rate of 1 K/min.

It is clear from FIG. 5 that the filler according to the invention has improved thermal stability.

The invention claimed is:

1. Flame-retardant filler based on aluminum hydroxide, wherein the filler is obtained by modifying aluminum hydroxide in form of a bayerite/gibbsite mixture at a temperature of at least 170° C. in the presence of water and acid or base as crystal growth regulator under pressure, the aluminum hydroxide used as starting material having an average particle size $d_{50}$ from 0.1 to 4 μm, wherein the bayerite portion of said bayerite/gibbsite mixture is at least 50wt %, based on the total weight of the bayerite and gibbsite.

2. Flame-retardant filler according to claim 1, wherein the filler it is a crystalline boehmite with the following parameters:
BET: between 70 and 150 m$^2$/g
$d_{10}$: 0.2 to 0.5 μm
$d_{50}$: 0.5 to 3.0 μm
$d_{90}$: 3.0 to 7.0 μm.

3. Flame-retardant filler according to claim 1, wherein the filler is a crystalline boehmite with the following parameters:
BET: between 8 and 40 m$^2$/g
$d_{10}$: 0.4 to 0.7 μm
$d_{50}$: 0.7 to 2.2 μm
$d_{90}$: 2.2 to 4.5 μm.

4. Flame-retardant filler according to claim 1, wherein the filler is a crystalline boehmite with the following parameters:
BET: between 80 and 150 m$^2$/g
$d_{10}$: 0.04 to 0.15 μm
$d_{50}$: 0.15 to 0.8 μm
$d_{90}$: 0.8 to 2.0 μm.

5. Method for the production of a flame-retardant filler based on aluminium hydroxide, wherein the aluminium hydroxide in form of a bayerite/gibbsite mixture is modified under pressure at a temperature of at least 170° C. in the presence of water and acid or base as crystal growth regulator, the aluminium hydroxide used as starting material having an average particle size $d_{50}$ from 0.1 to 4 μm wherein the bayerite portion of said bayerite/gibbsite mixture is at least 50wt %, based on the total weight of the bayerite and gibbsite.

6. Method according to claim 5, wherein the bayerite portion in the bayerite/gibbsite mixture, based on the weight of bayerite and gibbsite, is at least 70%.

7. Method according to claim 6, wherein the aluminium hydroxide used as starting material has a specific surface area of 1 to 100 m²/g.

8. Method according to claim 5, wherein the aluminium hydroxide used as starting material has an average particle size $d_{50}$ of 0.5 to 4 μm, in particular 1 to 3 μm, and particularly preferred about 2 μm.

9. Method according to any of claim 5, wherein the amount of aluminium hydroxide is in the range 1 to 30 wt.-%, based on the total weight of water and aluminium hydroxide.

10. Method according to any of claim 5, wherein the temperature is in the range from 170° C. to 340° C.

11. Method according to any of claim 5, wherein modification is carried out under pressure in a range from 7 to 144.2 bar.

12. Method according to any of claim 5, wherein the modification is carried out under autogenous pressure in an autoclave.

13. Method according to any of claim 5, wherein the in that modification is carried out for a period of at least 10 minutes, especially.

14. Method according to one of claim 5, wherein the acid is used as crystal growth regulator, the pH value preferably being in the range from 0.5 to 6, or base is used as crystal growth regulator, the pH value referably being in the range from 10 to 14.

15. Method according to claim 13, wherein in that hydrochloric acid or amidosulphonic acid is used as crystal-growth-regulating acid, or sodium hydroxide is used as crystal-growth-regulating base.

16. Method according to any of claim 5, wherein in that, after cooling, the resulting solid is separated from the aqueous liquid, washed and dried.

17. Method according to claim 16, wherein drying is carried out in a stove, by spray drying, in a belt dryer or by methods in which the product is fluidized with hot air and is conveyed through a kind of mill.

18. Method according to claim 16, wherein the washed solid is resuspended for spray drying, optionally adding dispersant.

19. A polymer composition comprising a polymer and the flame retardant filler of claim 1.

20. A polymer composition according to claim 19, wherein it contains 0.1 to 250 parts of the filler per 100 parts of the polymer.

* * * * *